US009277141B2

(12) United States Patent
Portnoy

(10) Patent No.: US 9,277,141 B2
(45) Date of Patent: Mar. 1, 2016

(54) SYSTEM, METHOD, AND SOFTWARE FOR IMAGE PROCESSING

(75) Inventor: Andrew D. Portnoy, Waltham, MA (US)

(73) Assignee: Raytheon Company, Waltham, MA (US)

(*) Notice: Subject to any disclaimer, the term of this patent is extended or adjusted under 35 U.S.C. 154(b) by 1148 days.

(21) Appl. No.: 12/855,472

(22) Filed: Aug. 12, 2010

(65) Prior Publication Data
US 2012/0038777 A1    Feb. 16, 2012

(51) Int. Cl.
H04N 5/33    (2006.01)
(52) U.S. Cl.
CPC ........................................ H04N 5/33 (2013.01)
(58) Field of Classification Search
CPC ....................................................... H04N 5/33
USPC ............ 348/25, 162, 164, 206–376; 382/162; 250/338.1; 351/206
See application file for complete search history.

(56) References Cited

U.S. PATENT DOCUMENTS

| | | | | |
|---|---|---|---|---|
| 5,129,595 A | * | 7/1992 | Thiede et al. | 244/3.16 |
| 5,262,871 A | * | 11/1993 | Wilder et al. | 348/307 |
| 5,317,395 A | * | 5/1994 | Carr et al. | 348/164 |
| 5,875,034 A | * | 2/1999 | Shintani et al. | 358/296 |
| 5,880,778 A | * | 3/1999 | Akagi | 348/218.1 |
| 6,188,777 B1 | * | 2/2001 | Darrell et al. | 382/103 |
| 6,353,223 B1 | * | 3/2002 | Ookawa | 250/330 |
| 6,366,693 B1 | * | 4/2002 | Silverbrook et al. | 382/162 |
| 6,760,074 B1 | * | 7/2004 | Maruyama et al. | 348/375 |
| 7,272,242 B2 | * | 9/2007 | Nevis et al. | 382/103 |
| 8,203,611 B2 | * | 6/2012 | Honda et al. | 348/162 |
| 2002/0105584 A1 | * | 8/2002 | Jung et al. | 348/303 |
| 2004/0003409 A1 | * | 1/2004 | Berstis | 725/105 |
| 2004/0010803 A1 | * | 1/2004 | Berstis | 725/105 |
| 2004/0095492 A1 | * | 5/2004 | Baxter et al. | 348/302 |
| 2004/0207752 A1 | * | 10/2004 | Lin et al. | 348/449 |

(Continued)

FOREIGN PATENT DOCUMENTS

EP    1 089 555 A1    4/2001
WO    WO 0054135 A1 *  9/2000    ................ G06F 3/00

OTHER PUBLICATIONS

Communication from European Patent Office dated May 12, 2011, European Search Report for Application No. 11154913.5 2202, 7 pages.

(Continued)

Primary Examiner — Dave Czekaj
Assistant Examiner — Shanika Brumfield
(74) Attorney, Agent, or Firm — Lewis Roca Rothgerber Christie LLP

(57) ABSTRACT

According to certain embodiments, an image processing system includes a computing system that receives a video signal including data for one or more images and determines a region of interest in a particular image of the one or more images. Using the determined region of interest, the computing system instructs the camera to generate a peripheral region of one or more subsequent images having a reduced information intensity level relative to the information intensity level with which the region of interest of the one or more subsequent images are generated. The region of interest of the one or more subsequent images corresponds to the region of interest of the particular image. The peripheral region including portions of the image other than the region of interest.

14 Claims, 2 Drawing Sheets

(56) References Cited

U.S. PATENT DOCUMENTS

| | | |
|---|---|---|
| 2006/0232674 A1* | 10/2006 | Cochran ........................ 348/164 |
| 2007/0029484 A1* | 2/2007 | Anderson et al. .......... 250/338.1 |
| 2008/0129844 A1* | 6/2008 | Cusack et al. ................. 348/241 |
| 2009/0207905 A1* | 8/2009 | Tomita ..................... 375/240.01 |
| 2009/0225189 A1* | 9/2009 | Morin ........................ 348/229.1 |
| 2010/0157049 A1* | 6/2010 | Dvir et al. ..................... 348/143 |
| 2010/0238294 A1* | 9/2010 | Hogasten et al. ............. 348/164 |
| 2011/0199578 A1* | 8/2011 | Black et al. ................... 351/206 |

OTHER PUBLICATIONS

Mohan Shankar, "Sampling and Signal Estimation in Computational Optical Sensors," Dissertation, Department of Electrical and Computer Engineering, Duke University, 2007.

Pending U.S. Appl. No. 13/026,854 by Stephen H. Black et al., entitled "Imaging System", 28 total pages. Feb. 14, 2011.

* cited by examiner

SYSTEM, METHOD, AND SOFTWARE FOR IMAGE PROCESSING

TECHNICAL FIELD OF THE DISCLOSURE

This disclosure generally relates to imaging systems, and more particularly, to a system, method, and software for image processing.

BACKGROUND

Image processing systems generally process imagery from a camera into a form suitable for view on a display. Image processing systems may enhance the quality of imagery that may otherwise be difficult to view without imagery enhancement and/or provide other suitable functionality. Image processing systems are often implemented with a computer processor that processes video signals that have been digitized using an analog-to-digital (ADC) circuit or other similar type of digitizing circuitry. Image processing systems may perform various types of image processing on a digitized video signal to manipulate imagery represented by the video signal. For example, image processing systems may perform one or more fast Fourier transforms (FFTs) on the received video signal from which one or more filters may be applied to sharpen, change contrast, or change color hue of the imagery represented by the video signal.

SUMMARY

In accordance with the present disclosure, disadvantages and problems associated with previous and existing image processing systems may be reduced or eliminated.

According to certain embodiments, an image processing system includes a computing system that receives a video signal including data for one or more images and determines a region of interest in a particular image of the one or more images. Using the determined region of interest, the computing system instructs the camera to generate a peripheral region of one or more subsequent images having a reduced information intensity level relative to the information intensity level with which the region of interest of the one or more subsequent images are generated. The region of interest of the one or more subsequent images corresponds to the region of interest of the particular image. The peripheral region includes portions of the image other than the region of interest.

Certain embodiments of the present disclosure may provide one or more technical advantages. For example, certain embodiments of the image processing system may use less electrical power than conventional image processing systems. Cameras typically use electrical power at levels that in many cases, may make them generally unsuitable for use in handheld devices that are often powered by portable power sources, such as batteries. By selectively scanning certain regions of the image, the image processing system may be enabled for use in applications, such as handheld devices that may inherently have limited amounts of electrical power.

For example, focal plane array devices such as microbolometers may be particularly useful for acquiring imagery within the longwave infrared light spectrum. These devices, however, may consume relatively large levels of electrical power due to the manner in which light in the longwave infrared spectrum is acquired. Thus, selectively acquiring only certain regions of imagery may reduce power requirements for these devices and thus enable their usage in handheld devices in certain embodiments.

Additionally, selectively scanning certain regions of imagery may reduce the amount of data that is processed by the image processing system such that a further reduction in electrical power may be consumed by the image processing system. Although image processing systems may provide valuable enhancement of imagery, their use may be limited when used with portable equipment, such as those that rely upon battery power for their operation. Image processing techniques performed by known image processing systems typically require a relatively large number of computer operations to perform their tasks. These computer operations may draw power at levels that, in some cases, may preclude their use in certain portable devices whose source of power may have a limited capacity. Certain embodiments of the image processing system according to the teachings of the present disclosure may provide a solution to this problem by selectively reducing acquisition, by the camera, of portions of the video signal such that power drawn from the power source by the camera may be reduced.

Certain embodiments of the present disclosure may provide some, all, or none of these advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of embodiments of the present disclosure and the features and advantages thereof, reference is made to the following description taken in conjunction with the accompanying drawings, in which.

DESCRIPTION OF EXAMPLE EMBODIMENTS

Figure 1:
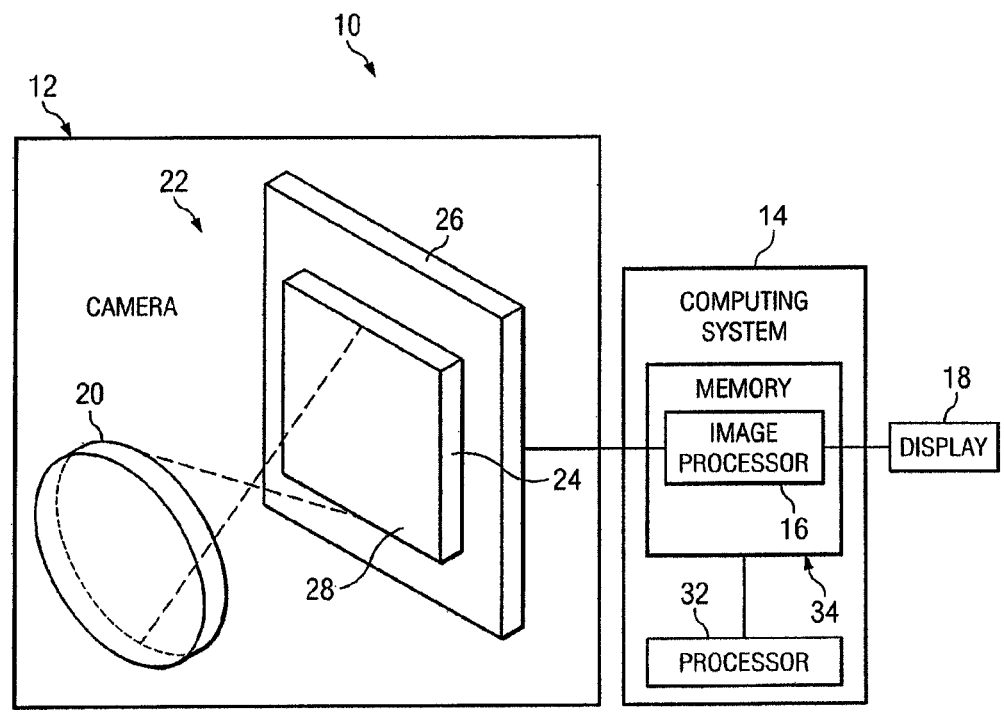
FIG. 1 illustrates an example image processing system according to certain embodiments of the present disclosure.

FIG. 1 illustrates an example image processing system 10 according to certain embodiments of the present disclosure. Image processing system 10 includes a camera 12, a computing system 14 that comprises an image processor 16, and a display 18. Image processor 16 receives video signals from camera 12, processes data comprising one or more images from the received video signals, and transmits the processed images to display 18. As will be described in detail below, image processor 16 controls camera 12 to acquire video signals that have reduced information intensity level in certain regions such that power consumption of image processing system 10 may be reduced.

Camera 12 includes a lens 20 and a read-out integrated circuit 22 having an focal plane array device or other suitable image generating device and an associated drive circuit 26. Lens 20 refracts or reflects light to form an image on focal plane array device 24. Focal plane array device 24 converts light present on its surface 28 to a video signal representing a sequence of images formed by light from lens 20. Camera 12 may be any type of camera that generates video signals from received light energy. In certain embodiments, camera 12 may be a longwave infrared camera that receives and processes light in the longwave infrared spectrum.

Operation of focal plane array device 24 is controlled by drive circuit 26. Drive circuit 26 may include several components that control operation of focal plane array device 24, such as power circuitry, timing circuitry, and/or synchronization circuitry. Drive circuit 26 may also include other components associated with operation of focal plane array device 24, such as amplifying circuitry to amplify video signals from focal plane array device 24, filter circuitry to manipulate video signals from focal plane array device, and/or an analog-to-digital (A/D) circuitry to digitize video signals generated by focal plane array device 24.

Certain embodiments of focal plane array device 24 generate video signals by scanning its surface to detect light intensity levels over its surface 28 and generate images representing the detected variations in light levels. According to the teachings of the present disclosure, focal plane array device 24 may be controlled by image processor 16 to selectively scan portions of its surface such that its surface 28 is partially scanned during acquisition of imagery. That is, focal plane array device 24 may be controlled by image processor 16 to not scan certain regions of its surface 28 while other regions of its surface are fully scanned according to one or more regions of interest detected by image processor 16.

Certain embodiments of image processing system 10 may use less electrical power than conventional image processing systems. Image sensors typically use electrical power at levels that in some cases, may make them generally unsuitable for use in handheld devices that are often powered by portable power sources, such as batteries. By selectively scanning certain regions of the surface 28 of focal plane array device 24, image processing system 10 may enabled for use in applications, such as handheld devices that may inherently have limited amounts of electrical power.

For example, focal plane array devices such as microbolometers may be particularly useful for acquiring imagery within the longwave infrared light spectrum. These devices, however, may consume relatively large levels of electrical power due to the manner in which light in the longwave infrared spectrum is acquired. Thus, selectively acquiring only certain regions of imagery may reduce power requirements for these devices and thus enable their usage in handheld devices in certain embodiments.

Additionally, selectively scanning certain regions of imagery may reduce the amount of data that is processed by image processing system 10 such that a further reduction in electrical power may be consumed by image processing system 10. Although image processing systems may provide valuable enhancement of imagery, their use may be limited when used with portable equipment, such as those that rely upon battery power for their operation. Image processing techniques performed by known image processing systems typically require a relatively large number of computer operations to perform their tasks. These computer operations may draw power at levels that, in some cases, may preclude their use in certain portable devices whose source of power may have a limited capacity. Certain embodiments of the image processing system according to the teachings of the present disclosure may provide a solution to this problem by selectively reducing acquisition, by the camera, of portions of the video signal such that power drawn from the power source by the camera may be reduced.

Image processor 16 processes data in video signals from read-out integrated circuit 22 into a form suitable for view on display 18. Image processor 16 may process data from video signals in any suitable manner. For example, image processor 16 may perform sharpening algorithms on data in video signals received from camera 12 to sharpen imagery for view on display 18. As another example, image processor 16 may include an image recognition algorithm that detects certain features, such as colors or outlines, that may not be easily detectable by the human eye.

Image processor 16 determines regions of interest, and instructs focal plane array device 24 to partially scan certain regions according to the determined regions of interest. Image processor 16 also uses this information to combine images from received video signal into a form suitable for view on display 18. Video signals output from image processor 16 may be viewable on any suitable type of display, which may include, for example, those that display video signals conforming to a National Television System Committee (NTSC) protocol, Phase Alternating Line (PAL) protocol, or a sequential color with memory (SECAM) protocol.

Computer display 18 is any device that generates a viewable images from video signals processed by image processor 16. In certain embodiments, display 18 is a head mounted display (HMD) that may be sufficiently small to be placed in relatively close proximity to a human eye. HMDs typically include relatively small computer displays that may be positioned in front of the user's eye. Thus, computer displays of this type may provide for use of image processing system 10 in optical devices, such as binoculars, telescopes, or head mounted displays.

Optical devices, such as these may be particularly useful as portable devices. The utility provided by certain optical devices, however, may be limited by their level of portability. For example, although binoculars may be generally useful to users who may be traveling on foot, their usefulness may be diminished if their size and weight creates an undue burden. It is known that image processors may be relatively small in size and weight, yet they may exhibit power requirements that are proportional to their processing load irrespective of their size and/or weight. Therefore, the weight and size of batteries that power image processing circuits may limit the portability of and thus utility of optical devices, such as binoculars or head mounted displays. Certain embodiment of image processing system 10 may provide a solution to this problem by reducing power requirements while maintaining a sufficient level of information intensity for regions of interest determined by image processor 16.

Computing system 14 includes one or more processors 32 and one or more memory units 34. A processor as described herein may include one or more microprocessors, controllers, or any other suitable computing devices or resources and may work, either alone or with other components of image processing system 10, to provide a portion or all of the functionality of image processing system 10 described herein. A memory unit 34 as described herein may take the form of volatile and/or non-volatile memory including, without limitation, magnetic media, optical media, random access memory (RAM), read-only memory (ROM), removable media, or any other suitable memory component. A portion or all of memory units 34 may be remote from computing system 14, if appropriate.

Computing system 14 may include an image processor 16 that is operable to determine regions of interest in imagery generated by camera 12. Image processor 16 may be implemented in any suitable combination of hardware, firmware, and software. Additionally, image processor 16 may be implemented in a single location or in a distributed fashion (e.g., such that certain functions described with respect to image processor 16 are provided on a system other than computing system 14), according to particular needs.

Embodiments of image processor 16 may include logic contained within a medium. Logic may include hardware, software, and/or other logic. The medium in which the logic is encoded may include a tangible medium. The logic may perform operations when executed by processor 32. Certain logic may include a computer program, software, computer executable instructions, and/or instructions capable being executed by computing system 14. The logic may also be embedded within any other suitable medium without departing from the scope of the disclosure.

The components of computing system 14 may be implemented using any suitable combination of software, firmware, and hardware. These components may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more servers, a server pool, one or more processors within these or other devices, or any other suitable processing device.

Components of image processing system 10 may be communicatively coupled with other computing systems via a network. The network facilitates wireless or wireline communication, and may communicate, for example, IP packets, Frame Relay frames, Asynchronous Transfer Mode (ATM) cells, voice, video, data, and other suitable information between network addresses. The network may include one or more LANs, radio access networks (RANs), metropolitan area networks (MANs), WANs, all or a portion of the global computer network known as the Internet, and/or any other communication system or systems at one or more locations.

In operation, image processor 16 receives video signals representing one or more images from focal plane array device 24, determines a region of interest in the received images, and controls focal plane array device 24 to reduce information intensity certain regions of the generated video signal. In this manner, power consumption of focal plane array device 24 may be reduced by turning off its image acquisition circuitry for at least a part of its operation. Additionally, reduced acquisition of video data may reduce the amount of processing load upon image processor 16 for further reduction in power consumption in certain embodiments.

Figure 2:
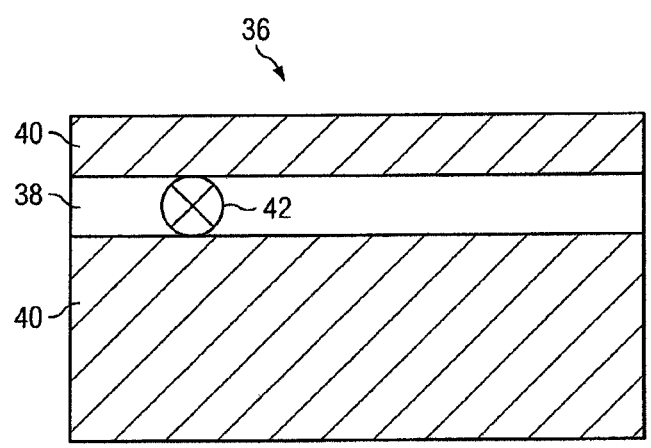
FIG. 2 illustrates an example image that may be displayed on the display by the image processing system of FIG. 1.

FIG. 2 illustrates an example image 36 that may be displayed on the display 18 by the image processing system of FIG. 1. Image 36 includes a region of interest 38 and a peripheral region 40 comprising portions of the image other than the region of interest 38. Region of interest 38 generally describes a portion of image 36 that is scanned by focal plane array device at its full scan rate, while peripheral region 40 generally describes a portion of image 36 that is partially scanned by focal plane array device 24.

Partial scanning of peripheral region 40 may be accomplished in any suitable manner. In the particular example shown, image processor 16 controls focal plane array device 24 to not scan certain rows 44 within peripheral region 40. A row 44 generally refers to a linear segment of information acquired by focal plane array device 24 and typically extends laterally across image 36. Thus, focal plane array device 24 may provide a reduced information intensity level in peripheral region 40 by scanning only a portion of its rows 44.

In certain embodiments, focal plane array device 24 may provide a reduced information intensity level by performing an interlaced scan technique in peripheral region 40 while performing a progressive scan technique in region of interest 38. The interlaced scan technique generally describes a process whereby odd rows and even rows of image 36 are alternatively scanned to form the image. The interlace scan technique may, therefore, reduce information intensity by a factor of two due to scanning at half the overall rate that would by provided by the progressive scan technique that scans all rows 44 sequentially.

As shown, region of interest 38 includes an element that may be, for example, a moving object, or an object having a particular color scheme and/or shape that may be of interest to the user. Element 42 may be determined by image processor 16, or element 42 may be determined manually by the user.

Region of interest 38 may have any size and incorporate any portion of the generated image 36. The size and position of region of interest 38 may be determined by image processor 16 according to information included in image 36. For example, image processor 16 may determine that a particular element in the upper, left corner of image 36 to be a region of interest 38 at one instant, and determine another element in the lower, right corner of image 36 to be another region of interest 38 at a later instant. Thus, the size and position of region of interest 38 may change during operation of image processing system 10.

Figure 3:
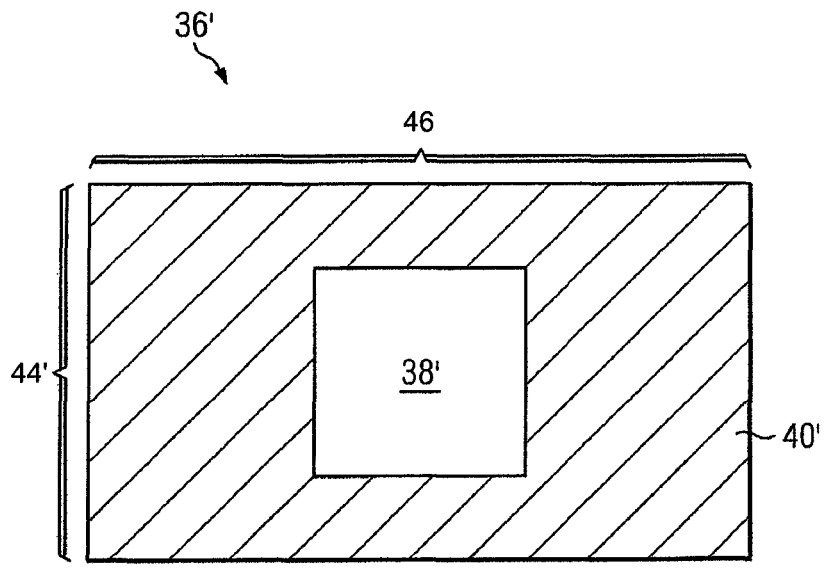
FIG. 3 illustrates another example image that may be displayed on the display by the image processing system of FIG. 1.

FIG. 3 illustrates another example image 36' that may be displayed on the display 18 by the image processing system 10 of FIG. 1. Like image 36 of FIG. 2, image 36' includes a region of interest 38' and a peripheral region 40' having a reduced information intensity level relative to region of interest 38'. Image 36' generated by image processor 16 differs, however, in that its peripheral region 40' comprises certain rows 44' and columns 46 of image 36' having reduced information intensity relative to region of interest 38'.

Rows 44' of peripheral region 40' that are above and below region of interest 38' may be processed in a manner similar to the manner in which image processor 16 processes the peripheral region 40 of image 36. Rows 44' coinciding with region of interest 38' may be processed by selectively turning off focal plane array device 24 while scanning in the peripheral region 40' and turning on focal plane array device 24 while scanning through region of interest 38'.

In the particular example shown, region of interest 38' is a foveal region of image 36'. The human eye has a foveal region that detects visual information with greater precision than other portions of the eye. The foveal region yields a portion of the eye's field-of-view that is more precise. In most cases, the foveal region is centrally located within the field-of-view. The centrally located region of interest 38' may therefore, provide enhanced visual information intensity for the foveal region, while the peripheral region 40' displays video information with reduced visual information intensity. Certain embodiments of region of interest 38' including a foveal region may be particularly useful for displays, such as HMDs that remain generally static relative to the user's eye.

Figure 4:
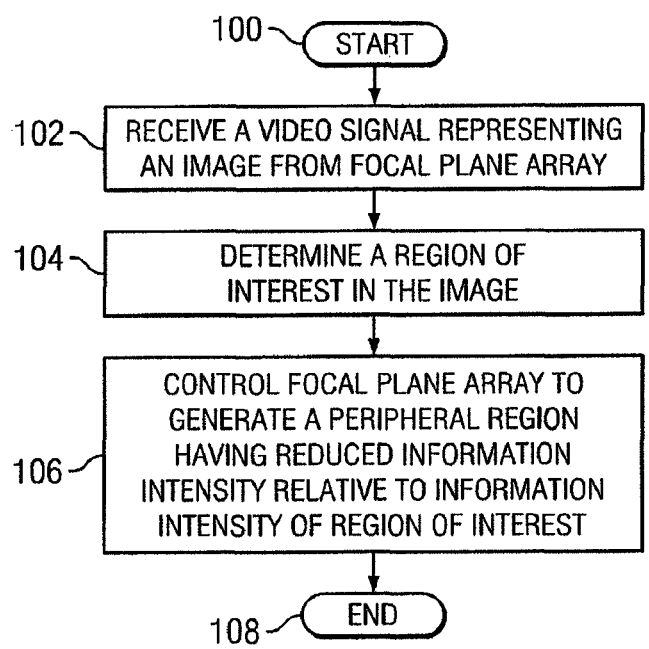
FIG. 4 illustrates an example method for image processing according to certain embodiments of the present disclosure.

FIG. 4 illustrates an example method for image processing according to certain embodiments of the present disclosure. In act 100 the process in initiated.

In act 102, image processor 16 receives a video signal comprising data for one or more images from focal plane array device 24. Focal plane array device 24 may be any suitable type that generates video signals according to images formed by light. In certain embodiments, focal plane array device 24 includes a microbolometer that generates video signals according to light in the longwave infrared spectrum.

In act 104, image processor 16 determines a region of interest 38 or 38' in the received image 36 or 36'. In certain embodiments, image processor 16 may determine region of interest 38 or 38' according to features within image 36 or 36'. For example, image processor 16 may store visual characteristics associated with a particular object in memory 34, such as the object's color, contrast, and/or shape. Image processor 16 may compare the received image 36 or 36' with these stored visual characteristics to determine a particular region of interest 38 or 38'.

In certain embodiments, image processor 16 may determine region of interest 38 or 38' according to a rate of change of information within image 36 or 36'. For example, the received image 36 or 36' may include video information associated with a fugitive running across a field. Although other objects such as plants in the field may remain essentially stationary, imagery associated with the running fugitive may have a rate of change sufficient to trigger image processor 16 to determine a region of interest 38 or 38' that includes video information associated with the running fugitive.

In certain embodiments, image processor 16 may determine region of interest 38 or 38' according to manual input from its user. For example, image processing system 10 may include a mouse or other similar device that receives user input for moving a cursor across display 18, and a selection button for selecting a desired region of interest 38 or 38' by image processor 16.

In act 106, image processor 16 controls focal plane array device 24 to generate a peripheral region 40 or 40' having reduced information intensity relative a region of interest 38 or 38' of image 36 or 36'. Image processor 16 may control focal plane array device 24 to reduce the information intensity level of peripheral region 40 or 40' in any suitable manner. In certain embodiments, image processor 16 may instruct focal plane array device 24 to not acquire certain rows 44 or 44' of peripheral region 40 or 40' of image 36 or 36', respectively. In certain embodiments, image processor 16 may instruct focal plane array device 24 to not acquire certain rows 44' and/or columns 46 of peripheral region 40' of image 36'.

The previously described process continues during operation of image processing system 10. When operation of image processing system 10 is no longer needed or desired, the process ends in act 108.

Modifications, additions, or omissions may be made to the previously described process without departing from the scope of the disclosure. The process may include more, fewer, or other acts. For example, image processor 16 may apply one or more filters to the received imagery for adjusting color hue, contrast, or other visual aspects of the generated imagery. As another example, determination of one or more regions of interest 38 or 38' within image 36 or 36' may be made according to one or more threshold values that may be manually selectable by the user.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. An image processing system comprising:
    an infrared camera;
    one or more memory units; and
    one or more processing units operable to:
        receive, from the camera, a video signal comprising data for one or more images;
        determine a region of interest in a particular image of the one or more images; and
        transmit, to the camera, a control signal instructing the camera to generate a peripheral region of one or more subsequent images with a reduced information intensity level relative to an information intensity level with which a region of interest of the one or more subsequent images are generated, the region of interest of the one or more subsequent images corresponding to the region of interest of the particular image, the peripheral region comprising portions of the subsequent one or more images other than the region of interest, the peripheral region comprising a plurality of rows,
    wherein the camera comprises a focal plane array device operable to generate the video signal by scanning light representing the one or more images, the focal plane array device generating the peripheral region of the one or more subsequent images with reduced information intensity level by scanning fewer than all of the rows of the peripheral region of the one or more subsequent images,
    wherein the one or more processing units comprise an image processor, the image processor being a distributed processor comprising a plurality of processors;
    wherein a first component of the image processing system is connected to a second component of the image processing system via a network,
    wherein the network comprises a LAN and is configured to communicate data packets of a kind selected from the group consisting of IP packets, Frame Relay frames, and Asynchronous Transfer Mode (ATM) cells,
    wherein the image processing system further comprises a display connected to the image processor, and
    wherein the image processing system is configured to selectively turn off the focal plane array device while scanning in the peripheral region.

2. The image processing system of claim 1, wherein the one or processing units are operable to determine the region of interest according to one or more visual characteristics of the region of interest, the visual characteristics comprising one or more of the following:
    a color of the region of interest;
    a contrast of the region of interest; or
    a shape of one or more objects in the region of interest.

3. The image processing system of claim 1, wherein the one or more images comprise a plurality of images, the one or more processing units are operable to determine the region of interest according to a rate of change of information in the region of interest over the plurality of the one or more images.

4. The image processing system of claim 1, wherein the one or more processing units are operable to determine the region of interest according to manual input from a user.

5. The image processing system of claim 1, wherein the camera comprises an infrared camera operable to generate the video signal from longwave infrared light.

6. The image processing system of claim 1, further comprising a hand-held housing that houses the camera, the one or more memory units, the one or more processing units, and a battery operable to power the camera, the one or more memory units, and the one or more processing units.

7. The image processing system of claim 1, comprising a hand-held housing that houses the infrared camera, the one or more memory units, the one or more processing units, and a battery operable to power the camera, the one or more memory units, and the one or more processing units.

8. An image processing method for an image processing system, the method comprising:

receiving, by a computing system comprising one or more processing units and one or more memory units, from a camera, a video signal comprising data for one or more images;

determining, by the computing system, a region of interest in a particular image of the one or more images;

transmitting, by the computing system, to the camera, a control signal instructing the camera to generate a peripheral region of one or more subsequent images with a reduced information intensity level relative to the information intensity level with which a region of interest of the one or more subsequent images are generated, the region of interest of the one or more subsequent images corresponding to the region of interest of the particular image, the peripheral region comprising portions of the subsequent one or more images other than the region of interest, the peripheral region comprising a plurality of rows; and generating the video signal by scanning light representing the one or more images using a focal plane array device, the focal plane array device generating the peripheral region of the one or more subsequent images with reduced information intensity level by scanning fewer than all of the rows of the peripheral region of the one or more subsequent images, wherein the computing system comprises an image processor, the image processor being a distributed processor comprising a plurality of processors;

wherein a first component of the image processing system is connected to a second component of the image processing system via a network, wherein the network comprises a LAN and is configured to communicate data packets of a kind selected from the group consisting of IP packets, Frame Relay frames, and Asynchronous Transfer Mode (ATM) cells, wherein the image processing system further comprises a display connected to the image processor, and wherein the image processing system is configured to selectively turn off the focal plane array device while scanning in the peripheral region.

9. The image processing method of claim 8, further comprising:
determining the region of interest according to one or more visual characteristics of the region of interest, the visual characteristics comprising one or more of the following:
a color of the region of interest;
a contrast of the region of interest; or
a shape of one or more objects in the region of interest.

10. The image processing method of claim 8, further comprising:
determining the region of interest according to a rate of change of information in the region of interest over a plurality of the one or more images, the plurality of images comprising the one or more images.

11. The image processing method of claim 8, further comprising determining the region of interest according to manual input from a user.

12. The image processing method of claim 8, further comprising:
generating, using an infrared camera, the video signal from longwave infrared light.

13. The image processing method of claim 12, wherein the infrared camera comprises a microbolometer.

14. The image processing method of claim 8, further comprising:
powering the camera, the one or more memory units, and the one or more processing units using a battery, the camera, the one or more memory units, the one or more processing units, and the battery housed in a hand-held housing.

* * * * *